United States Patent [19]

Sonoda et al.

[11] 4,239,791

[45] Dec. 16, 1980

[54] METHOD OF MANUFACTURING AN INPUT SCREEN FOR AN IMAGE INTENSIFIER

[75] Inventors: Tomiya Sonoda, Machida; Hiroshi Washida, Yokohama, both of Japan

[73] Assignee: Tokyo Shibaura Denki Kabushiki Kaisha, Kawasaki, Japan

[21] Appl. No.: 964,519

[22] Filed: Nov. 29, 1978

[30] Foreign Application Priority Data

Dec. 5, 1977 [JP] Japan ................................ 52-145149

[51] Int. Cl.[2] ................................................ G01T 1/16

[52] U.S. Cl. .................................. 427/64; 204/35 N; 204/38 A; 427/65; 427/70; 427/157

[58] Field of Search ..................... 427/64, 65, 70, 157; 204/35 N, 38 A

[56] References Cited

U.S. PATENT DOCUMENTS 3,825,763 7/1974 Ligtenberg et al. ............... 427/65 X

*Primary Examiner*—James R. Hoffman

*Attorney, Agent, or Firm*—Cushman, Darby & Cushman

[57] ABSTRACT

A method of manufacturing an input screen for an image intensifier which comprises the steps of thermally depositing a phosphor layer of alkaline metal halide on one side of a substrate to provide a phosphor layer formed of columnar crystals extending in a direction substantially perpendicular to the plane of the substrate; treating the surface of the phosphor layer by a liquid material of low boiling point and incapable of dissolving the phosphor, thereby producing cracks extending in a direction substantially perpendicular to the plane of the substrate in said phosphor layer; and forming a photoemissive layer on the surface of the phosphor layer, thereby enabling the phosphor layer to have a high light-guiding property and ensuring the prominent elevation of the resolving power of an image intensifier.

8 Claims, 3 Drawing Figures

METHOD OF MANUFACTURING AN INPUT SCREEN FOR AN IMAGE INTENSIFIER

BACKGROUND OF THE INVENTION

This invention relates to a method of manufacturing an input screen for an image intensifier which converts an image defined by radioactive rays such as gamma rays and X-rays into a visible pattern.

An image intensifier which converts high energy radioactive rays such as gamma rays and X-rays into a visible bright light pattern comprises an input screen and an output screen which converts an image of photoelectrons issued from the input screen into a visible image. This type of image intensifier is desired to produce a distinctly resolved visible image. To this end, it is required for an image of radioactive rays to be truthfully converted into an image of photoelectrons.

Generally, the input screen of the image intensifier comprises a substrate prepared from, for example, aluminum permeable to radioactive rays; an alkaline halide phosphor layer deposited on the substrate and enabled to effectively emit a light upon receipt of radioactive rays; and a photoemissive layer deposited on the phosphor layer and formed of, for example, an compound of antimony-cesium (Sb—Cs) sensitive to a phosphor light.

FIG. 1 shows a prior art input screen intended to truthfully convert an image of radioactive rays emitted from a source into an image of photoelectrons. The input screen of FIG. 1 comprises a substrate 11, phosphor layer 12 and photoemissive layer 15. A large number of cracks 13 are formed in the phosphor layer 12, which, therefore, actually consists of an aggregate of numerous phosphor blocks 14 defined by the cracks. This construction of the phosphor layer 12 causes beams 16 of a light to be scattered in such a direction as ensures their landing on the photoemissive layer 15, thereby elevating the resolution of the original image of radioactive rays. The light beams 16 are scattered only within the phosphor blocks 14, which act as a guide for the light beams 16 to be carried to the photoemissive layer 15.

One of the known processes of manufacturing the input screen is to deposit a phosphor layer 12 of cesium iodide on the aluminum substrate 11, impart thermal shocks to the phosphor layer 12, thereby producing cracks therein due to the different thermal expansion coefficients of the aluminum substrate 11 and phosphor layer 12.

However, an input screen manufactured by the abovementioned prior art process has the following drawbacks.

(1) Phosphor blocks defined by cracks have an unduly large size, presenting difficulties in being reduced, and consequently in elevating the resolution of the original image of radioactive rays. Further, it is difficult to ensure the reproducibility of the size of the phosphor blocks.

(2) It is difficult to produce cracks extending throughout the thickness of the phosphor layer 12 merely by stresses resulting from the different thermal expansion coefficients of the substrate 11 and phosphor layer 12. As a result, the phosphor layer 12 fails to fully display the action of guiding light beams to the photoemissive layer 15.

(3) For the reasons given under the above items (1), (2), an X-ray image intensifier using the prior art input screen has a degree of resolution of 28 to 30 line-pair/cm.

As mentioned above, the known input screen has the drawbacks that it is impossible to fully resolve the original image of radioactive rays; the size of phosphor blocks defined by cracks is difficult to reproduce, resulting in a decline in the property of guiding light beams to the photoemissive layer 15; and consequently the prior art input screen has been found unadapted for use with an image intensifier.

SUMMARY OF THE INVENTION

It is accordingly the object of this invention to provide a method of manufacturing an input screen for an image intensifier which is provided with a phosphor layer having a high light-guiding property, thereby prominently improving the resolution of the original image of radioactive rays.

According to this invention, there is provided a method of manufacturing an input screen for an image intensifier which comprises the steps of depositing a phosphor layer of alkaline metal halide all over the surface of a substrate, said phosphor layer being formed of columnar crystals extending in a direction substantially perpendicular to the plane of the substrate; treating the phosphor layer with a liquid material of low boiling point and incapable of dissolving the phosphor of alkaline metal halide, thereby forming cracks extending in a direction substantially perpendicular to the plane of the substrate in said phosphor layer and producing a large number of optically independent phosphor blocks defined by said cracks; and depositing a photoemissive layer on said phosphor layer.

DESCRIPTION OF THE PREFERRED EMBODIMENTS

Figure 1:
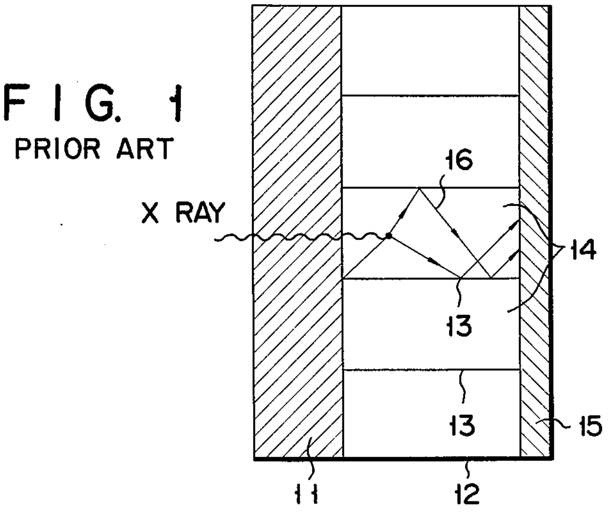
FIG. 1 PRIOR ART
FIG. 1 is a fractional sectional view of the prior art input screen for an image intensifier.
Figure 2:
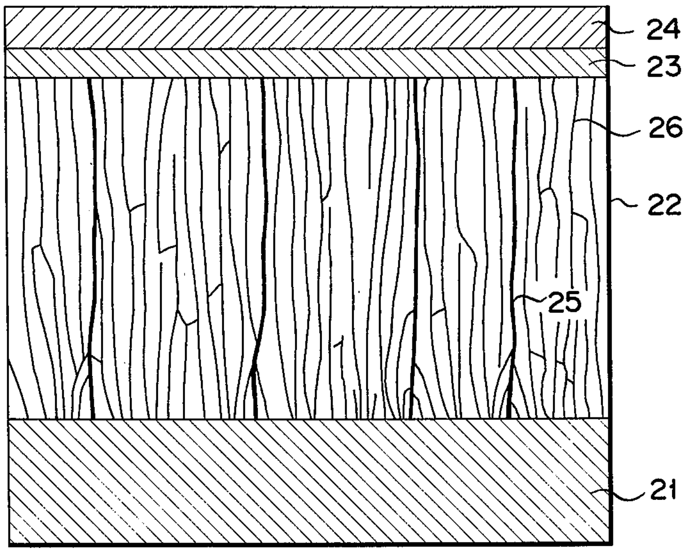
FIG. 2 is a fractional sectional view of an input screen according to one embodiment of this invention for an image intensifier.
Figure 3:
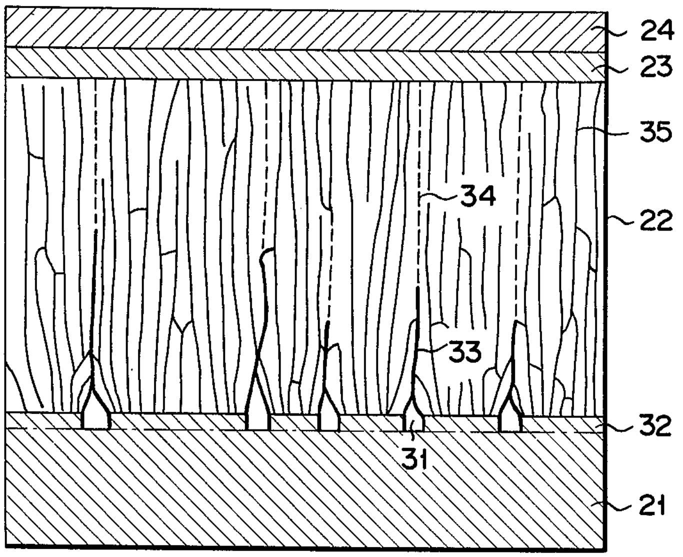
FIG. 3 is a fractional sectional view of an input screen according to another embodiment of the invention for an image intensifier.

We will now describe by reference to FIGS. 2 and 3 an input screen according to two embodiments of this invention.

Referring to FIG. 2, an input screen according to one embodiment of the invention comprises a substrate 21 of, for example, aluminum; a phosphor layer 22 of alkaline metal halide such as cesium iodide or potassium iodide deposited on the substrate and formed of columnar crystals extending in a direction substantially perpendicular to the plane of the substrate; an intermediate thin film 23 of, for example, alumina or indium oxide deposited on the phosphor layer 22; and a photoemissive layer 24 of, for example, Sb-Cs compound or Sb-K-Cs compound deposited on the thin film 23.

According to the method of this invention, the phosphor layer 22 is treated by a liquid material, thereby producing cracks 25 along the columnar crystals of the phosphor layer 22. These cracks 25 define optically independent phosphor blocks 26 (constituted by an agglomeration of columnar crystals). In other words, light beams are scattered and reflected within the respective phosphor blocks themselves and are not carried into the adjacent phosphor blocks.

FIG. 3 shows an input screen according to another embodiment of this invention for an image intensifier. Numerous mosaic patterns 32 defined by fine grooves 31 are formed on the surface of the substrate 21. Where the phosphor layer 22 is formed on the mosaic patterns 32, then the grooves 31 give rise to short cracks 33 in the phosphor layer 22. Where the phosphor layer 22 is further treated by a liquid material, then elongate fissures 34 (indicated in broken lines) are formed. These short cracks 33 and elongate fissures 34 define optically independent phosphor blocks 35 (each constituted by a mass of columnar crystals).

The cracks 25 and elongate fissures 34 appearing on the phosphor layer 22 are produced by first growing the columnar crystals of the phosphor layer 22 on the substrate 21 so as to extend in a direction perpendicular to the plane of the substrate 21 and then treating the phosphor layer 22 by a liquid material.

Treatment of the phosphor layer 22 by a liquid material is carried out by any of the following processes:

(1) A liquid material wetting the phosphor layer 22 is evaporated. The evaporation of the liquid material may be effected by applying heat. The liquid material which has seeped into fine interstices between the crystals of the phosphor layer 22 vaporizes to increase in volume and imparts stresses to the surrounding phosphor crystals, thereby giving rise to cracks and fissures. This process is particularly adapted to manufacture an input screen having a structure shown in FIG. 3.

(2) A liquid material wetting the phosphor layer 22 is frozen into the solid form by means of a freezing medium such as liquid nitrogen. The frozen liquid material is thawed away in an atmosphere of nitrogen free from moisture. The liquid material which has been carried into the fine gaps between the crystals of the phosphor layer 22 expands or contracts depending on its kind when frozen into the solid form to impart great stresses to the surrounding phosphor crystals, thereby giving rise to cracks and fissures along the grain boundaries of weakly bonded columnar crystals.

(3) A phosphor layer heated to, for example 150° C. is quenched by a liquid material. The phosphor layer which has a large thermal expansion coefficient rapidly shrinks due to quenching. As a result, cracks are formed along the grain boundaries of weakly bonded columnar crystals. This treating process is suitable for the manufacture of an input screen constructed as shown in FIGS. 2 and 3.

A liquid material used in the above-mentioned treatment is preferred to be an organic solvent having a lower boiling point than 100° C. and incapable of dissolving a phosphor. Such solvent includes alcohols such as methanol or ethanol; ketones such as acetone or methylethyl ketone; esters such as ethyl acetate; and aromatic compounds such as benzene. Further, the liquid material may be formed of a mixture of the above-listed compounds.

With the input screen of FIGS. 2 and 3, mosaic patterns are formed on the surface of the substrate 21. With the input screen of FIG. 3, the size of phosphor blocks can be controlled with greater ease, and cracks can be formed with a higher reproducibility of size.

According to the above-mentioned method of this invention, treatment of a phosphor layer by a liquid material produces a far greater stress than that which results from the different thermal expansion coefficients of the substrate and phosphor layer. Accordingly, cracks extending throughout the thickness of a phosphor layer are reliably produced, thereby providing a phosphor layer having a prominent capacity to guide light beams to the photoemissive layer. Therefore, application of an input screen manufactured by the method of this invention noticeably elevates the resolving power of an image intensifier.

The process of manufacturing an input screen having a structure shown in FIG. 3 has the following advantages.

(1) Formation of cracks in a phosphor layer starts from that side thereof which faces a substrate. Therefore, such phosphor layer has a large capacity of guiding light beams to a photoemissive layer, thereby enabling the original image of radioactive rays to be resolved with higher precision.

(2) It is possible to reduce the size of phosphor blocks controlled by the mosaic patterns formed on the surface of the substrate, thereby ensuring the high resolving power of an image intensifier.

(3) Since short cracks are previously formed in part of the phosphor layer, the cracks can be produced throughout the thickness of the phosphor layer with far greater ease and higher degree of reproducibility than when cracks are formed simply by the different thermal expansion coefficients of the substrate and phosphor layer as has been practised in the prior art.

This invention will be more fully understood by reference to the following examples related to the manufacture of an input screen constructed as illustrated in FIGS. 2 and 3.

EXAMPLE 1

This example relates to the process of manufacturing the input screen of FIG. 2.

A phosphor layer 22 of cesium iodide was evaporated on an aluminum substrate 21 0.5 mm thick at a temperature of 40° C. to 150° C. (for example 100° C.) at the rate of 3 to 6 microns/min. to a thickness of about 150 microns. As a result, columnar crystals having a diameter of 1 to 5 microns were grown which extended in a direction substantially perpendicular to the plane of the aluminum substrate. At this point, the phosphor layer 22 indicated substantially no light-guiding capacity.

The phosphor layer 22 evaporated on the aluminum substrate 21 was heated 10 minutes at 150° C. in an atmosphere of nitrogen. Thereafter, the phosphor layer 22 was quenched by being dipped in a liquid material, for example, acetone. At this time, cracks 25 were easily formed in the phosphor layer 22 of cesium iodide which had a large thermal expansion coefficient. The cracks 25 extended throughout the thickness of the phosphor layer 22, which therefore indicated a high light-guiding property. The phosphor layer 22 did not peel off the substrate 21, nor were produced blots or smears on the surface of the phosphor layer 22.

Where the acetone was replaced by methyl alcohol or ethyl acetate, the same type of cracks were produced in the phosphor layer 22.

According to the method of this example, cracks 25 sometimes defined large phosphor blocks 26, where the phosphor layer 22 was formed thick, thereby leading to a decline in the resolution of an image intensifier. To avoid this drawback, the phosphor layer 22 was treated by a liquid material, each time its thickness increased at the rate of, for example, 70 microns. In other words, thermal deposition of the phosphor layer 22 and its treatment by a liquid material were carried out alternately. As a result, a phosphor layer consisting of small phosphor blocks was obtained.

EXAMPLE 2

This example relates to the manufacture of an input screen having a structure as shown in FIG. 3.

That side of an aluminum substrate 21 0.5 mm thick on which a phosphor layer was to be deposited was subjected to anodic oxidation in the following procedure. The aluminum substrate 21 was dipped in, for example, a 3% solution of oxalic acid. Current was introduced about 2 hours at the current density of 1 $A/dm^2$ with the aluminum substrate 21 used as an anode. Thereafter the aluminum substrate 21 was dipped in boiling water to seal pores formed in the substrate. As a result, an aluminum oxide layer including crystal water was formed on the aluminum substrate 21. Where the mass was heated to a higher temperature than 250° C., for example, 300° C., then mosaic patterns 32 defined by fine grooves 31 were formed on the surface of the substrate 21. The grooves 31 were about 3 to 7 microns wide and about 10 microns deep. Most of the mosaic patterns 32 had a maximum diameter of 50 to 100 microns.

A phosphor layer of cesium iodide was evaporated on the surface-treated substrate at a temperature of 40° to 150° C., for example, 100° C. at the rate of 3 to 6 microns/min. for example, 5 microns/min. to a thickness of about 150 microns. As a result, there were formed on the surface of the mosaic patterns 32 of the substrate 21 columnar crystals which had a diameter of 1 to 5 microns and extended in a direction substantially perpendicular to the plane of the substrate. The phosphor blocks 35 were defined by cracks 33 resulting from fine grooves 31 which outlined the mosaic patterns 32, and were formed of said columnar crystals.

The crystals of cesium iodide gradually grew bigger during evaporation due to the temperature of the substrate or the heat radiated from a boat containing the cesium iodide. Therefore, cracks resulting from the grooves 31 gradually narrower or mostly vanished due to irregular growth of crystals caused by fluctuations in the conditions of vapor deposition, before the cracks extended to the surface of the phosphor layer 22. Accordingly, the phosphor layer 22 thus formed failed to effectively guide light beams to a photoemissive layer 24.

Where, however, the phosphor layer 22 evaporated on the substrate 21 was treated by the same procedure as that which was used in Example 1, then new cracks 34 started from the spots where the preceding cracks disappeared, and extended up to the surface of the phosphor layer. Now, the phosphor layer 22 effectively guided light beams to the photoemissive layer 24. The phosphor layer 22 did not peel off the substrate 21, nor were produced blots or smears on the surface thereof.

There was applied another process of treating a phosphor layer 22 by a liquid material. The phosphor layer 22 deposited on the surface of the substrate 21 was fully wetted by a volatile liquid material, for example, acetone. The wetted phosphor layer 22 was dipped for scores of seconds in liquefied nitrogen received in a nitrogen chamber to solidify the aforesaid volatile liquid material. After taken out, the mass was left in an atmosphere of nitrogen, until the temperature returned to the level of room temperature. New cracks 34 started in the phosphor layer 22 thus treated from the spots where the preceding cracks 33 vanished, and extended through the thickness of the phosphor layer 22 up to its surface. This event was supposed to arise from the fact that internal stresses were applied to the phosphor layer 22 due to changes occurring in the volume of the liquid material during its solidification by freezing. The phosphor layer 22 thus produced indicated the same prominent capacity of guiding light beams to the photoemissive layer as in the preceding case.

Where, according to Example 2, the phosphor layer was treated by a liquid material, new cracks started from the spots where the cracks 33 resulting from the fine grooves 31 vanished. These new cracks 34 extended through the thickness of the phosphor layer 22 up to its surface. The phosphor blocks 35 formed of columnar crystals surrounded by said cracks appeared on the surface of the mosaic patterns 32. These phosphor blocks 35 acted as a very useful light guide for a picture element.

The surface of the phosphor layer 22 in which cracks were created by treatment using a liquid material indicated a labyrinthian pattern, and was reduced in conductivity. It is therefore preferred that a thin conductive film 23 be formed between the phospor layer 22 and photoemissive layer 24 to let it have a uniform property all over the phosphor layer 22. The thin conductive film 23 is formed by evaporation a layer of indium oxide having a thickness of, for example, 100 to 3000 A on the surface of the phosphor layer 22. The photoemissive layer 24 is prepared from a Sb-Cs or Sb-K-Cs compound by the customary process.

The resolution of the phosphor layer 22 largely depends on the length and width of the phosphor blocks 35. As previously mentioned, the method of this invention enables phosphor blocks 35 to be formed throughout the thickness of the phosphor layer 22. Further, the size of the phosphor blocks 35 can be reduced to, for example, scores of microns by controlling the size of the mosaic patterns 32. Accordingly, the method of the invention provides an image intensifier having a high resolution.

Experiments show that with an X-ray phosphor amplifier using an input screen embodying this invention, the modulation transfer function (MTF) was improved by 60% with the resolutional characteristics taken to be 20 line-pair/cm and also 50% taken to be 40 line-pair/cm. Even where picture signals of low frequency were applied, a picture contrast was noticeably improved. The MTF was prominently increased even in the region of high resolution. Further, the photoemissive layer 24 worked effectively.

Obviously, an input screen manufactured by the method of this invention is adapted to be used with not only an X-ray phosphor amplifier, but also another type of image intensifier which converts an X-rays or gamma ray image into a visible light image.

What we claim is:

1. A method of manufacturing an input screen for an image intensifier comprising the steps of:

(1) depositing a phosphor of alkaline metal halide on one side of a substrate to produce a phosphor layer consisting of columnar crystals extending in a direction substantially perpendicular to the plane of the substrate;

(2) treating the surface of the phosphor layer with a liquid material having a lower boiling point than 100° C. which liquid is incapable of dissolving the deposited phosphor, and producing cracks in said phosphor layer extending in a direction substantially perpendicular to the plane of the substrate, thereby forming a large number of optically independent phosphor blocks defined by said cracks; and (3) depositing a photoemissive layer on the thus deposited and coated phosphor layer.

2. The method according to claim 1, wherein the phosphor layer is treated by wetting with a liquid material and thereafter evaporating said liquid material.

3. The method according to claim 1, wherein the phosphor layer is treated by wetting with a liquid material, solidly freezing the liquid material which has seeped into the phosphor layer by dipping into a freezing medium, and thawing the frozen liquid material in an atmosphere free from moisture.

4. The method according to claim 1, wherein the phosphor layer is treated by heating to a temperature higher than 100° C., wetting and quenching with said liquid material.

5. The method according to claim 1, wherein the deposition of the phosphor layer of step (1) and the treatment with the liquid material of step (2) are repeated alternately.

6. The method according to claim 1, wherein the liquid material is an organic solvent having a boiling point less than 100° C. and selected from the group consisting of methanol, ethanol, acetone, methylethyl ketone, ethyl acetate and benzene.

7. The method according to claim 1, wherein a plurality of mosaic patterns defined by fine grooves are formed on one side of the substrate prior to deposition of the phosphor layer.

8. The method according to claim 7, wherein the mosaic patterns are formed by subjecting the surface of the substrate to anodic oxidation, sealing pores formed in said surface by dipping it in boiling water and heating the substrate thus treated.

* * * * *